United States Patent [19]

Gaujé

[11] Patent Number: 5,202,909
[45] Date of Patent: Apr. 13, 1993

[54] METHOD AND APPARATUS FOR MEASURING TRANSVERSE THICKNESS PROFILE OF A METAL STRIP

[75] Inventor: Pierre Gaujé, Evecquemont, France

[73] Assignee: Institute de Recherches de la Siderurgie Francaise (IRSID), Puteaux, France

[21] Appl. No.: 752,057

[22] Filed: Aug. 29, 1991

[30] Foreign Application Priority Data

Sep. 5, 1990 [FR] France .................. 90 11037

[51] Int. Cl.⁵ .......................... G01N 23/06
[52] U.S. Cl. ........................ 378/54; 378/55; 378/152
[58] Field of Search ............ 378/54, 51, 55, 56, 378/58, 62, 89, 145, 147, 150, 151, 152; 356/355, 356, 357, 358, 429, 430, 431, 432; 250/306, 307, 559, 560

[56] References Cited

U.S. PATENT DOCUMENTS

| | | | |
|---|---|---|---|
| 3,868,510 | 2/1975 | Murata et al. | 378/55 |
| 4,891,833 | 1/1990 | Bernardi | 378/152 |
| 4,954,719 | 9/1990 | Harris | 378/55 |

FOREIGN PATENT DOCUMENTS 0075190  3/1983  European Pat. Off. .
3113440 11/1982  Fed. Rep. of Germany .

OTHER PUBLICATIONS

IEEE 40th Annual Conference of Elec. Eng. Problems In Rubber & Plastics Ind Apr. 11, 1988, IEEE pp. 28-34, A new measurement and control system for rubber calendering.

*Primary Examiner*—David P. Porta
*Attorney, Agent, or Firm*—Cushman, Darby & Cushman

[57] ABSTRACT

The invention has an X-ray emitting tube and a linear detector on opposite sides of a plane containing a strip to be measured and an electronic acquisition, measuring and control unit. A mask transversely moveable relative to the strip occludes radiation from the X-ray emitting tube which is not intercepted by the strip or which passes through the edge region of the strip. This device offers an improved degree of precision measurement near the edge of the strip.

15 Claims, 2 Drawing Sheets

METHOD AND APPARATUS FOR MEASURING TRANSVERSE THICKNESS PROFILE OF A METAL STRIP

BACKGROUND OF THE INVENTION

1. Field of the Invention

The invention relates to a method and a device for measuring the thickness profile of a strip of metal, in particular steel, in a hot or cold sheet rolling system.

This device comprises a radiation emitting tube and a linear radiation detector disposed on opposite sides of the plane of said strip, and electronic acquisition, measuring and control means.

2. Description of Related Art

Devices for measuring the thickness profile of metal strips are known employing the absorption of X-rays and comprising an X-ray emitter and an X-ray detector formed by an ionization chamber having multiple detectors. These devices on one hand have an insufficient transverse resolution, of the order of 1.9 mm, owing to the multiple detector ionization chamber, and on the other hand do not provide sufficiently precise measurements in the region of the vicinity of the edge of the metal strip on a width which may extend several centimeters. This second drawback is due to the fact that the X-rays are diffused in an inhomogeneous manner in the vicinity of the edge of the strip and this inhomogeneity interferes with the measurement.

SUMMARY OF THE INVENTION

An object of the invention is therefore to improve the transverse resolution of such devices and permit measuring the thickness of the metal strip up to the close vicinity of the edge of the latter with good precision.

According to the invention, the device comprises a mask interposed between the emitting tube and the detector to partly occult the radiation emitted by the tube and mask the corresponding part of the detector.

The invention also provides a method comprising positioning above and below the strip, respectively, a radiation emitter and a linear detector of the emitted beam, and recording an electric signal representing the transverse variation in the thickness of the strip up to the vicinity of one of the edges of the strip.

According to the invention, the method is characterized in that it comprises interposing a mask between the detector and the emitter by positioning it in such a manner that it occults the part of the emitted beam which is not occulted by the strip and that it extends beyond the edge of the strip to a given width so as to occult the corresponding part of the radiation beam passing through the region of said edge, and maintaining said width to which said mask extends beyond the edge of the strip during the measurement.

According to other features of the invention, the mask is positioned either between the strip and the detector or between the emitting tube and the strip. It is positioned in such manner as to extend beyond the edge of the strip to a given width and occult the part of the radiation which is not occulted by the strip, and the part of the radiation occulted by the region of the strip located at the edge of the strip when it is located between the strip and the detector. When it is located between the emitter and the strip, the mask occults the part of the radiation which would be intercepted by the region of the strip located at the edge of the latter.

For the purpose of measuring a plurality of profiles or effecting a continuous measurement on a travelling strip, the mask may be placed on a movable support whose movements may be controlled by said electronic means. In this case, the electronic acquisition and measuring means comprise means for determining the width of the region located at the edge of the strip, and means for controlling the position of said mask by the measurement of the width of the region located at the edge of the strip so as to maintain said width constant.

The radiation emitting tube may be an X-ray emitter and the linear detector is advantageously a bar of photodiodes covered with a scintillating substance.

BRIEF DESCRIPTION OF THE DRAWINGS

Further features and advantages of the invention will be apparent from the following description, with reference to the accompanying drawings which illustrate a non-limitative embodiment of the invention, in which.

DETAILED DESCRIPTION OF THE PRESENTLY PREFERRED EMBODIMENTS

Figure 2:
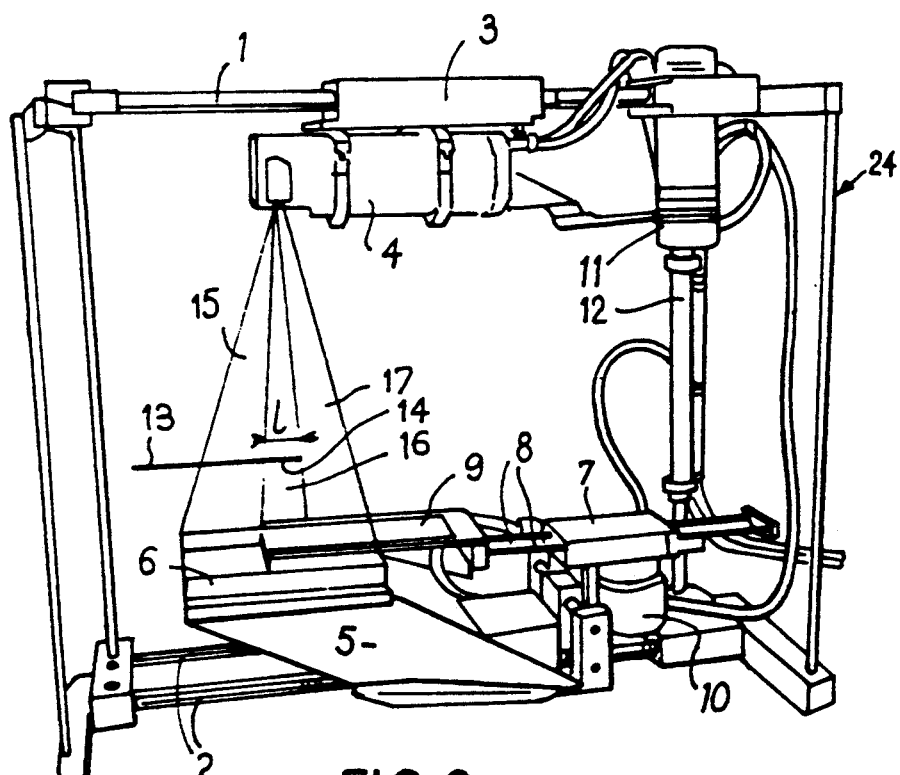
FIG. 2 is a perspective view of an embodiment of the measuring device according to the invention.

The device shown in FIG. 2 comprises upper slideways 1 and lower slideways 2 fixed to a frame 24. A carriage 3 is slidably mounted on the upper slideways 1 and carries an emitting tube 4 emitting X-rays (or optionally gamma-rays). A carriage 5 is slidably mounted on the lower slideways 2 and carries, on one hand, a linear detector 6 and, on the other hand, a unit 7 in which are slidable slideways 8 carrying a plate 9 fixed to the ends of the slideways 8. The carriage 5 also carries a step motor 10 for driving the slideways 8 in translation in the unit 7 through means such as a toothed belt (not shown).

A step motor 11 mounted on the frame 24 drives the carriage 3 in a known manner, for example through an upper toothed belt (not shown) extending along the slideways 1 and connected to the carriage 3. The motor 11 also drives the carriage 5 through a shaft 12 and a toothed belt (not shown) extending along a slideway 2 and connected to the carriage 5.

The plate 9 is composed of a material closely similar to that of the strips whose thicknesses will be measured with the described device, for example mild steel. The thickness of the plate 9 may vary in steps. Each step then serves as a standard of thickness but may also be employed as a mask, as will be explained hereinafter; however, to perform this function, the plate may be replaced by a plate of constant thickness. Known means are used to detect the position of the carriages 3 and 5 with respect to the frame 24 and the position of the plate 9 with respect to the unit 7 connected to the carriage 5.

The means controlling the step motors 10 and 11, the means detecting the position of the movable carriages 3 and 5 and plate 9, the means controlling the X-ray tube 4, and the linear detector 6 are connected to electronic acquisition, measuring and control means 21 (FIG. 1) arranged in a known manner.

When it is desired to measure the transverse thickness profile of a strip 13, composed of, for example, steel, the measuring apparatus is disposed so that the strip 13 is located between the slideways 1 and 2 in a plane parallel to the slideways and, for example located about 20 cm above the detector 6. The strip extends horizontally and is either moving or stationary on the rolling mill.

By means of the motor 11, the carriages 3 and 5 are shifted to dispose the X-ray tube 4 and the detector 6 in face-to-face and in alignment with the region of the strip the thickness of which is desired to be measured. This region is formed by the region 30 passed through by a part 15 of the X-ray beam passing through the strip 13 and not intercepted by the mask 9.

Figure 1:
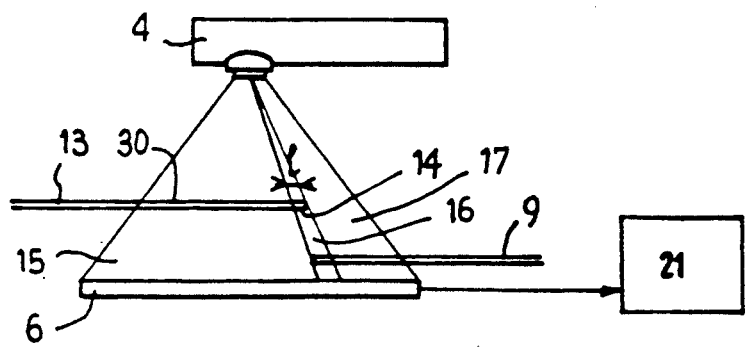
FIG. 1 is a diagrammatic elevational view illustrating the principle of the invention.

By means of the motor 10, the plate 9 is disposed as shown in FIGS. 1 and 2 in such manner as to mask the part 17 of the beam which is not intercepted by the strip 13 and the part 16 of the beam intercepted by the region 14 of the strip located in the immediate vicinity of the edge of the latter.

The part 15 of the X-ray beam, after having passed through the strip 13, is received by the detector 6 which produces a signal recorded by the electronic acquisition, measuring and control means 21.

This signal represents the intensity of the X-ray received by each of the points of the detector 6 in accordance with their position. This signal permits determining by a calculation known per se the thickness profile in the transverse direction of the strip.

Figure 3:
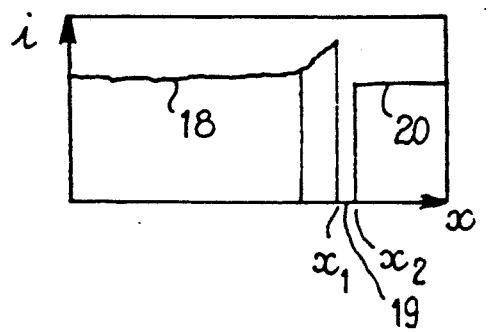
FIG. 3 is a graph illustrating the signal delivered by the detector with the use of a mask according to the invention.

FIG. 3 is a graph representing the signal produced by the detector 6, with the positions x of the measurement point along the detector 6 plotted as abscissae and the intensities i of the emitted signal as ordinates. The curve obtained has three parts:

A first part 18 corresponding to the portion 15 of the X-ray beam which passes through the strip 13 and only the latter. This part 18 permits calculating the thickness of the strip.

A second part 19 corresponding to the portion 16 of the X-ray beam which passes through both the strip 13 and the mask 9 (edge region 14). This portion is located between the abscissae x1 and x2 and the difference $\Delta x = x2 - x1$ between these abscissae represents the width of the region 14 of the strip 13 occulted by the mask 9, in which region the thickness cannot be measured. This region may have, for example, a width of 1 to 2 mm.

A third part 20 corresponds to the portion 17 of the X-ray beam intercepted by the mask 9 alone. This portion is not directly used for the measurement but may serve as a thickness reference.

As the strip 13 may be in motion during the measurement, its edge may move relative to the measuring device. This movement of the edge may vary the width 1 of the region of the overlapping of the strip 13 and the mask 9 and may even cause this overlapping region to disappear. This is in particular the case when the thickness measuring device is installed on a line on which the strip 13 is continuously travelling.

In order to avoid this drawback, the position of the mask 9 is governed by known means by a width 1 of the region in which the strip 13 and the mask 9 overlap so as to maintain this width 1 constant.

To this end, the electronic and computer acquisition, measuring and control means determine in the known manner x2 and x1, then calculate $\Delta x = x2 - x1$, and compare $\Delta x$ with a reference $\Delta x0$ chosen by the operator. The difference $\Delta x - \Delta x0$ then serves as an actuating signal for the means actuating the motor 10 which shifts the slideways 8 and the mask 9 until this difference disappears.

Figure 4:
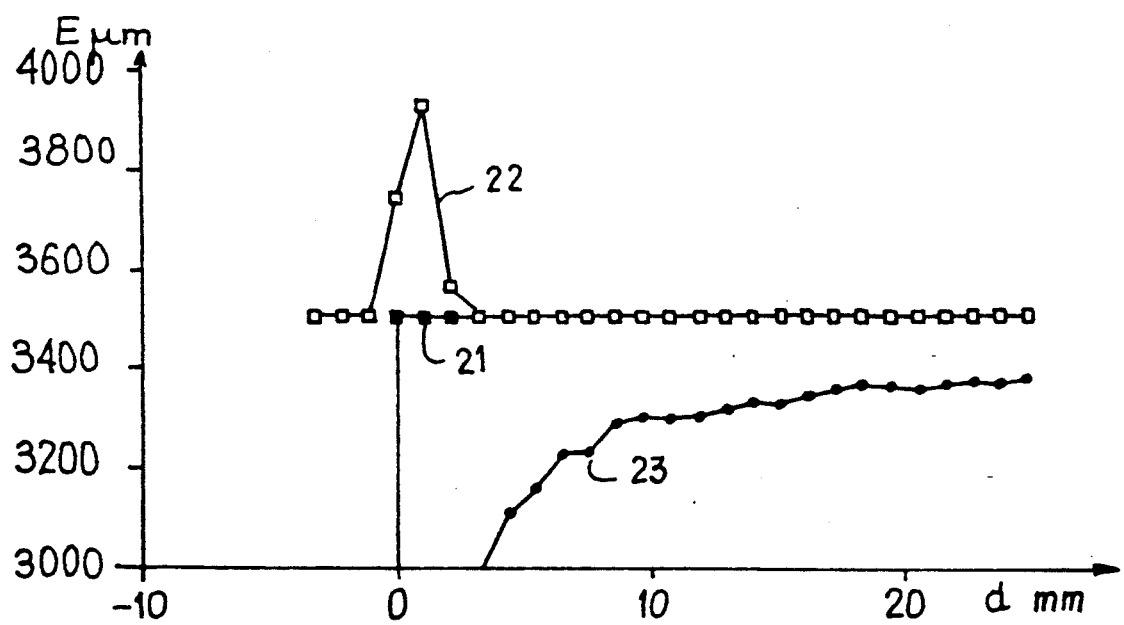
FIG. 4 is a graph showing an example of the measurement effected by the device according to the invention.

FIG. 4 is a graph in which the widths d of the strip 13 are plotted as abscissae and the thickness E in $\mu m$ as ordinates, and which gives a numerical example of the measurements made from the edge of the strip (abscissa of zero).

The strip of mild steel may have a thickness of 3.5 mm and the supply voltage of the X-ray tube may be 75 kV. The curve 21 represents the real thickness profile of the strip. The curve 22 represents the profile measured by the device according to the invention with the mask 9 in position. It can be seen that, apart from the first three millimeters, the measurement is excellent since the curve 22 substantially coincides with the curve 21. The peak observed in the first three millimeters of the curve 22 comes from the overlapping between the strip 13 and the mask 9 in the edge region 14.

The curve 23 is the thickness measured by the device according to the invention but in which the mask 9 has been removed. It can be seen in this curve 23 that the effect of the diffusion of the X-rays and the dazzling of the detector 6 is very great, since it renders the measurement false at least up to 25 mm from the edge.

The device according to the invention therefore permits obtaining a transverse resolution of about 1 mm and a very satisfactory measuring precision in the vicinity of the edge of the strip. For a strip having a thickness of less than a millimeter, the measuring time for the complete profile is within the range of 0.1 sec to 1 sec. Further, as the photodiode detectors are much simpler than the multiple ionization chamber detectors, they are much cheaper.

The linear detector may be a detector of the type THX 9577 from the firm THOMSON. It comprises, in particular, a bar of 144 rectangular photodiodes measuring 1.6 mm by 3.2 mm and covered with a scintillating substance.

Among the various possible variants there may be mentioned that in which the mask 9 may be disposed between the X-ray emitter 4 and the strip 13 the thickness of which is to be measured.

What is claimed is:

1. An apparatus for measuring a thickness profile of a metal strip by radiation absorption comprising:
   a radiation emitting tube disposed on a side of a plane substantially defined by said strip;
   a linear radiation detector disposed on a side of said plane opposite said tube for generating a signal profile representative of an amount of radiation incident thereon;
   a mask interposed between said tube and said detector to partly occult the radiation emitted by said tube and mask a corresponding part of said detector;
   determining means for receiving said signal profile and determining a first position at which said profile changes from a first level representing radiation occulted only by said strip to a second level representing radiation occulted by said strip and by said mask, and for determining a second position at which said signal profile changes from said second level to a third level representing radiation occulted only by said mask;
   difference means for generating a signal indicative of a difference between said first and second positions; and control means responsive to said difference signal for controlling a position of said mask to maintain said difference at a predetermined amount.

2. An apparatus according to claim 1, wherein said mask is located between said strip and said detector.

3. An apparatus according to claim 2, wherein:
an edge of said mask is disposed to cover a region of said strip adjacent to an edge of said strip, said strip edge region having a predetermined width; and
said mask is disposed to occult radiation from said tube not occulted by said strip and radiation from said tube occulted by said strip edge region.

4. An apparatus according to claim 3, further comprising:
a support moveable in a direction perpendicular to said edge of said strip, said mask being disposed on said support; wherein
said control means controls said mask position by moving said support.

5. An apparatus according to claim 1, wherein said mask is located between said tube and said strip.

6. An apparatus according to claim 3, wherein:
said mask is disposed to occult radiation from said tube not occulted by said strip and radiation from said tube occulted by a region of said strip adjacent to an edge of said strip, aid strip edge region having a predetermined width.

7. An apparatus according to claim 6, further comprising:
a support moveable in a direction perpendicular to said edge of said strip, said mask being disposed on said support; wherein
said control means controls said mask position by moving said support.

8. An apparatus according to claim 1, wherein said radiation emitted by said tube is X-ray radiation.

9. An apparatus according to claim 8, said linear detector comprising:
an array of photodetectors; and
a scintillating substance disposed between said tube and said array.

10. An apparatus according to claim 1, further comprising reference means responsive to a portion of said thickness profile at said third level for generating a reference thickness signal.

11. An apparatus according to claim 10, wherein said mask comprises a plurality of steps, each of said steps having a different thickness.

12. An apparatus according to claim 1, further comprising:
a fixed frame;
first guiding slideways disposed in an upper part of said frame;
second guiding slideways disposed in a lower part of said frame;
a first carriage carrying said tube, said first carriage being slidably mounted on said first guiding slideways;
a second carriage carrying said linear detector, said second carriage being slidably mounted on said second slideways;
a unit;
third slideways slidably mounted in said unit, said third slideways carrying said mask, and extending in a direction perpendicular to a longitudinal direction of said strip; and
motors for controlling displacements of said carriages and said mask.

13. An apparatus according to claim 1, wherein said mask has a composition similar to that of said strip.

14. A method for measuring a thickness profile of a metal strip by radiation absorption comprising the steps of:
providing a radiation emitting tube and a linear radiation detector on opposite sides of a plane substantially defined by a strip to be measured;
providing a mask between said tube and said detector so that the mask occults radiation from said tube not occulted by said strip and radiation from said tube occulted by a region of said strip proximate to an edge of said strip, said strip edge region having a predetermined width;
irradiating said detector with radiation from said tube to generate a thickness profile from said detector representative of radiation incident thereon;
determining a first position at which said profile changes from a first level representing radiation occulted only by said strip to a second level representing radiation occulted by said strip and by said mask;
determining a second position at which said signal profile changes from said second level to a third level representing radiation occulted only by said mask;
determining a difference between said first and second positions; and
controlling a position of said mask to maintain said difference at a predetermined amount.

15. A method according to claim 14, further comprising a step of generating a reference thickness signal responsive to a portion of said thickness profile at said third level.

* * * * *